United States Patent [19]
Jordan

[11] Patent Number: 5,902,389
[45] Date of Patent: May 11, 1999

[54] ROSIN-BASED RESIN INK VEHICLES

[75] Inventor: Thomas C. Jordan, Century, Fla.

[73] Assignee: Arizona Chemical Company, Panama City, Fla.

[21] Appl. No.: 08/975,585

[22] Filed: Nov. 21, 1997

Related U.S. Application Data

[63] Continuation-in-part of application No. 08/826,011, Mar. 27, 1997, Pat. No. 5,820,667.

[51] Int. Cl.⁶ ............................ C09D 11/08; C09D 11/10
[52] U.S. Cl. ...................................... 106/31.41; 106/31.73
[58] Field of Search .............................. 106/31–41, 31.73

[56] References Cited

U.S. PATENT DOCUMENTS

| | | | |
|---|---|---|---|
| 4,664,710 | 5/1987 | Gleason et al. ............................ | 106/23 |
| 5,427,615 | 6/1995 | Jordan ..................................... | 106/222 |

FOREIGN PATENT DOCUMENTS

| | | | |
|---|---|---|---|
| 450733 | 8/1948 | Canada ................................ | 106/31.73 |
| 453687 | 12/1948 | Canada ................................ | 106/31.73 |

OTHER PUBLICATIONS

Chemical Abstracts #CA126(3):33230Y entitled "Manufacture of rosin–modified, self–gelling phenolic resin binders for offset printing inks" (Oct. 1996).

*Primary Examiner*—David Brunsman
*Attorney, Agent, or Firm*—Luedeka, Neely & Graham, P.C.

[57] ABSTRACT

The specification discloses an improved ink vehicle for lithographic ink formulations. The ink vehicle contains a high viscosity primary resin component and a co-resin which is an acid catalyzed rosin or modified rosin ester. As contrasted with an ink vehicle containing a base catalyzed rosin ester co-resin, vehicles containing the acid catalyzed rosin ester co-resin exhibit substantially lower water pick up rates which improve the emulsification properties of an ink formulation containing the vehicle. The specification also discloses a method for making an ink vehicle having improved water emulsification properties.

19 Claims, No Drawings

ROSIN-BASED RESIN INK VEHICLES

This application is a continuation-in-part of application Ser. No. 08/826,011, filed Mar. 27, 1997, now U.S. Pat. No. 5,820,667.

FIELD OF THE INVENTION

The invention relates to improved rosin-based resins and compositions containing such resins useful as ink vehicles in lithographic ink formulations.

BACKGROUND

Lithographic inks contain vehicles which give the formulations suitable properties for coating the image areas of a printing plate. In a lithographic process, the image and non-image areas are created on thin metal printing plates by a combination of photo-mechanical and photo-chemical processes which make the image area ink receptive and the non-image area water receptive. In the printing process the plate is wet first with water and then immediately thereafter with ink thereby creating the desired image in the ink receptive area of the plate. The image areas are oleophilic and hydrophobic whereas the non-image areas are hydrophilic and oleophobic. Accordingly, the image areas accept ink while the non-image areas are wet with water as a result of the physiochemical principle that oil and water do not mix. When using an ideal ink formulation, the ink only adheres to the image areas of the plate during the inking process.

After coating the image areas of the plate with ink, the plate then transfers ink from the image areas to a blanket or intermediate roller, which, in turn, transfers ink to a substrate or media to be printed. This method of printing is used in most commercial lithographic printing processes and is referred to as "offset" printing.

During the printing operation the ink and water come into contact with one another causing some degree of emulsification of the ink. The degree of emulsification of the ink in a lithographic printing system is important to the proper performance of the system. Too much water emulsification results in poor adhesion of the ink to the image areas whereas too little water emulsification results in poor image quality. Accordingly, the water balance in the ink formulation is critical to maintaining suitable printing operations.

High molecular weight phenolic or maleic modified rosin esters are commonly used in lithographic ink vehicles as a primary resin for improving the gel structure of the ink in order to improve the print quality and reduce misting of the finished ink during printing. It is common to include with the modified resins a secondary or co-resin to further modify the ink properties such as the ink transfer and ink oil solubility of the primary resin component.

Hydrocarbon-based resins have typically been used as suitable secondary or co-resins for improving the solubility of the primary resins in the ink oils. Hydrocarbon-based resins generally exhibit low water take up rates and thus have little effect on water emulsification of the ink. However, hydrocarbon-based co-resins generally possess poor compatibility with alkyd resins, vegetable oils and modified vegetable oils which are normally used in ink vehicle formulations. Hydrocarbon based resins also present increased environmental concerns. Such environmental concerns have prompted the use of base-catalyzed rosin esters as substitute secondary or co-resins.

Base-catalyzed rosin esters have comparable aliphatic oil dilutability and viscosity properties to the conventionally used hydrocarbon-based resins, and pose fewer environmental concerns. However, based-catalyzed rosin esters generally possess higher water pick up rates than hydrocarbon-based resins and tend to destabilize the water balance properties of ink formulations in printing applications.

Accordingly, it is an object of the invention to provide an improved vehicle for ink formulations.

Another object of the invention is to provide a method for making an ink vehicle for a lithographic ink formulation to enable production of ink having a relatively low water pick up rate.

Yet another object of the invention is to provide an environmentally friendly ink vehicle for a lithographic ink formulation.

Another object of the invention is to provide a secondary resin component for ink vehicle formulations which possesses substantial compatibility with alkyd resins and vegetable oils and which improves the solubility of a primary resin component in ink solvents.

The Invention

With regard to the above and other objects, the invention provides a lithographic ink vehicle which comprises a primary resin component and a secondary resin component for improving the solubility of the primary resin component consisting essentially of an acid catalyzed rosin ester. The vehicle further comprises an ink oil and, optionally, an organo-metallic gelling agent.

According to another aspect of the invention, a method is provided for making an ink vehicle for lithographic inks which comprises reacting rosin or modified rosin with a polyol in the presence of a Bronsted acid catalyst to produce an acid catalyzed rosin ester, combining the acid catalyzed rosin ester with a primary resin component and an ink oil to provide an ink vehicle having a lower water take up rate than the same vehicle made with a base catalyzed rosin ester.

The invention provides an improved solubilizing resin for use in making a lithographic ink vehicle which is comparable to vehicles made with hydrocarbon resins and which enables production of inks having excellent gloss and color transfer properties. The vehicle provides a relatively lower water take up rate than vehicles made with conventional base catalyzed rosin ester resins which increases the ability to provide a suitable water balance for a lithographic ink formulation so that emulsification problems are minimized.

A key feature of the invention is the use of a secondary or co-resin component which consists essentially of a rosin ester made with an acid catalyst and a polyhydric alcohol or polyol such as pentaerythritol, glycerin, dipentaerythritol, tripentaerythritol, trimethylol ethane, trimethylol propane, ethylene glycol, polyethylene glycol, 1,3-propanediol, 1,4-butanediol, 1,5-pentanediol, 1,6-hexanediol, trimethylene glycol, propylene glycol, neopentyl glycol and the like.

The term "rosin" as used herein for the acid catalyzed rosin ester and phenolic modified rosin ester will be understood to include gum rosin, wood rosin, tall oil rosin and modified rosins, i.e. dimerized, maleated and/or polymerized versions of any of these rosins. Rosin is derived from pine trees (chiefly *pinus palustris* and *pinus elliottii*). Gum rosin is the residue obtained after the distillation of turpentine from the oleoresin tapped from living pine trees. Wood rosin is obtained by extracting pine stumps with naphtha or other suitable solvents and distilling off the volatile fraction. Tall oil rosin is a co-product of the fractionation of tall oil which in turn is a by-product of the wood pulping process.

The principle constituents of rosin are rosin acids of the abietic and pimaric types. The acids usually have the general formula $C_{19}H_{29}COOH$ with a phenanthrene nucleus. Preferred rosins for use in the present invention are tall oil rosin and gum rosin.

For production of the acid-catalyzed rosin ester co-resin, the esterification reaction between the rosin and alcohol is preferably conducted with a stoichiometric excess of alcohol relative to acids present in the rosin wherein the ratio of moles of alcohol to moles of acids in the rosin ranges from about 1.05:1 to about 1.5:1. More or less alcohol may be used, however, for best results, i.e., lowest product acid numbers and lowest volatility, the ratio of moles of alcohol per mole of acids in the mixture is most preferably within the range of from about 1.3:1 to about 1.4:1. It is preferred that the resulting rosin ester have an acid number below about 25, more preferably below about 20 and most preferably below about 17 as determined by ASTM D465-59.

Suitable acid catalysts may be selected from Bronsted acids which include mineral acids and organic acids such as hypophosphorous acid, phosphorous acid, sulfuric acid, trisnonylphenylphosphite, toluene sulfonic acid, and the like. The amount of catalyst used for reacting a rosin with a polyhydric alcohol is based on the weight of rosin in the mixture and ranges from about 0.01% to about 5% by weight, preferably from about 0.02% to about 2.0% by weight.

A suitable reaction vessel for the esterification will typically contain a condenser for condensation and removal of water formed during the reaction and a means for mixing or stirring the reactants to assure complete reaction.

The reaction is typically conducted at a temperature in the range of from about 200° to about 290° C. Higher or lower temperatures may be used, however, for the most efficient reaction, temperatures in the above range are preferred. Total reaction time may range anywhere from about 10 to about 35 hours depending on the amount of reactants and scale of reaction equipment used. Accordingly, means are required for sustained or continuous heating of the reactants in the vessel. Suitable heating means include internal and external heaters as well as heated external circulation loops. However, the means for heating the reactants is not believed to be critical to the invention.

The reaction is conducted at atmospheric pressure and/or subatmospheric pressures, however, superatmospheric pressures may also be used. In order to reduce undesirable side reaction or oxidations, it is preferred to conduct the reaction under an inert gas blanket or purge employing, for example, nitrogen gas.

Completion of the reaction may be determined by the amount of water being formed as the reaction proceeds. Near the completion of the reaction, the amount of water being formed is substantially reduced. Completion of the reaction may also be determined by the acid number of the reaction mass. A low acid number relative to the acid number of the rosin charged to the reaction mass indicates that the reaction is near completion. Acid numbers in the range of 2 to 20 are typical for the desired reaction product.

Prior to reacting the rosin with the polyol, the rosin may be modified in order to alter various properties of the finished resin. Modification of the rosin may be provided by reacting rosin with a formaldehyde-phenol compound. Suitable phenol compounds which may be used to modify rosin include, without limitation, mononuclear or polynuclear phenols, mono- or poly-substituted $C_1$ to $C_{12}$-alkyl-phenols in which the $C_1$ to $C_{12}$ groups may be straight or branched chain alkyl groups. The reaction may be conducted by heating rosin with formaldehyde and at least one of the above-mentioned phenol compounds at a temperature ranging from about 130° to about 200° C., and preferably from about 140° to about 180° C.

Modification of rosin may also be accomplished by reacting rosin with a carboxylic acid compound or anhydride thereof which contains carbon double or triple bonds and is known to be a dieneophile. Examples of suitable acid or anhydride compounds which may be used include, without limitation, maleic anhydride, maleic acid, fumaric acid, acrylic acid, methacrylic acid, propiolic acid, itaconic acid, cinnamic acid and/or combinations of two or more of the foregoing. Modification of rosin by these acid or anhydride compounds is usually conducted by Diels-Alder-type reactions.

Once the reaction is complete, the rosin ester is steam and/or nitrogen gas stripped in order to remove low molecular weight materials from the reaction mass and to provide a resin having a relatively high softening point and relatively high solubility (aliphatic ink oil dilutability). Such resins are particularly suitable for lithographic ink formulations. A relatively high softening point for an acid catalyzed rosin ester is preferably in the range of from about 100° to about 160° C., most preferably from about 105° to about 150° C. Such softening points are determined according to ASTM Designation E28-67 method.

The solubility of the rosin ester is determined by titrating 10 grams of a 50% solution of the resin in MAGIESOL 47 with MAGIESOL 47 with stirring until the mixture reaches a cloud point or until 200 milliliters has been titrated into the solution at 25° C. The titrated amount is referred to as "MAGIESOL 47 (M47) tolerance." It is preferred, but not required, that the M47 tolerance of the rosin ester be above about 200 milliliters. Lower M47 tolerances are acceptable in some applications such as when a higher molecular weight resin is needed in order to provide more gel structure in the ink vehicle. MAGIESOL 47 has a Kauri butanol (KB) value of about 24.5, an aniline point of about 82.8° C. and a distillation range of about 240° to about 277° C. and is commercially available from Magie Brothers Oil Company, Division of Pennzoil of Franklin Park, Ill.

The high viscosity resin component or primary resin component of the lithographic ink vehicle may be selected from phenolic or maleic modified rosin esters and hydrocarbon resins or modified hydrocarbon resins which have relatively high viscosities and possess relatively limited solubility in ink oils at room temperature. Conventionally, hydrocarbon resins are derived from monomers containing from about 5 to about 15 carbon atoms such as 1,3-cyclopentadiene. Cyclopentadiene is formed along with other hydrocarbon compounds during the cracking of petroleum and is separated from the $C_4/C_5$ fractions by thermal dimerization followed by distillation to produce a residual dicyclopentadiene (DCPD) concentrate. The DCPD concentrates may vary in purity and may contain co-dimers of DCPD and other dienes. Often DCPD is copolymerized with modifiers such as rosin or distilled tall oil to provide resins with improved properties for printing ink applications. Maleic anhydride in conjunction with polyol may be used to modify such DCPD resins. Combinations of modified rosin esters and hydrocarbon resins may be used as the primary resin component of the ink vehicle.

Primary resin components typically have a solution viscosity in the range of from about Z2.0 to about Z10 at 25° C. measured on ten grams of resin dissolved in twenty grams of alkali refined linseed oil (1:2 ARLO) according to the Gardner Holdt bubble tube test method. The MAGIESOL 47 (M-47) tolerance of the primary resin component is determined by titrating 10 grams of the 1:2 ARLO cut with MAGIESOL 47 to a cloud point. MAGIESOL 47 tolerance for primary resin components ranges from about 0 to greater than about 200 milliliters at 25° C.

The ring and ball softening point of the primary resin component, as determined by ASTM E28-67, is generally from about 140° to about 180° C. Examples of primary resin components which may be used include, but are not limited to, phenolic modified rosin esters available from Arizona Chemical Company of Panama City, Fla. under the tradename BECKACITE 6024, maleic modified rosin esters available from Arizona Chemical Company under the tradename BECKACITE 4528 and modified hydrocarbon resins available from Neville Chemical Company of Pittsburgh, Pa. under the tradename NEVROZ 1420. The lithographic ink vehicle may contain from about 20 to about 50 wt. % of the primary resin component and from about 5 to about 25 wt. % of the acid catalyzed rosin ester co-resin.

In addition to the acid catalyzed rosin ester and primary resin component, the lithographic ink vehicle also contains a high boiling ink oil such as EXXPRINT 283D, which is a hydrogenated aliphatic ink oil commercially available from Exxon Company U.S.A. of Houston, Tex. or MAGIESOL 47. By "relatively high" it is meant that the boiling point of the material should be at least about 180° C. (and preferably at least about 240° C.), however, ink oils of widely varying boiling points, depending on the particular printing application, may be used in combination with the primary and secondary resin components of the ink vehicle composition. Other suitable ink oils include, without limitation, petroleum distillates and hydrotreated petroleum distillates.

For use in lithographic ink vehicles, the boiling point range of the ink oil preferably ranges from about 190° to about 535° C. and most preferably ranges from about 240° to about 307° C. The amount of oil in the lithographic ink vehicle may range from about 10 to about 95% by weight, preferably from about 40 to about 55% by weight based on the total weight of the vehicle.

The lithographic ink vehicle may also include an alkyd resin or a modified vegetable oil or both. The amount of alkyd resin, vegetable oil or both in the vehicle may range from about 1 to about 30 wt. % of the total ink vehicle weight.

In order to provide an ink vehicle having suitable rheological properties, a gelling agent may be included in the vehicle. Suitable gelling agents include organo-metallic gelling agents such as aluminum diisopropoxide acetoacetic ester chelate (AIE-M) or oxyaluminum octoate (OAO) or other suitable gelling agent. The amount of gelling agent in the vehicle may range from about 0 to about 5 wt. % of the total weight of the ink vehicle.

The order of addition of the components to a vessel to provide the ink vehicle is generally not critical to the invention. With the exception of the gelling agent, any or all of the components of the vehicle may be mixed in any order. Typically, the rosin esters, ink oils and alkyd resins are charged to a mixing vessel and stirred while heating the mixture to a temperature in the range of from about 150° to about 170° C. Once the phenolic modified rosin ester and acid catalyzed rosin ester are substantially dissolved in the ink oil, the gelling agent is added with stirring to produce a gelled lithographic ink vehicle.

The following nonlimiting examples illustrate various aspects of the invention.

EXAMPLE 1

An acid catalyzed modified rosin ester was prepared by charging a 1 liter flask with 370 grams of tall oil rosin (1.22 moles) while maintaining a nitrogen atmosphere in the flask. The tall oil rosin was heated to 180° C. while stirring the rosin. Next, 23.1 grams (0.24 moles) of maleic anhydride were added the flask and mixture was held at 180° C. for one hour. At the end of the one hour period, the reaction mass was heated to 210° C. and 58.8 grams (0.43 moles) of technical grade pentaerythritol were added to the flask. The reaction mass was heated to 270° C. at rate of 25° C. per hour and held at this temperature for 2 hours. Trisnonylphenylphosphite (TNPP) (0.6 grams, 0.0009 moles) was then added to the reaction mass and the reaction mass was held at 270° C. until the product had a softening point of about 134° C. and an acid number of about 20 (about 10 to 16 hours). When the desired softening point and acid number of the product were obtained, the reaction mass was cooled to 260° C. and steam sparged while applying a vacuum to the flask until a final softening point of 142.5° C. and an acid number of about 13.4 was obtained. At that point the product was nitrogen sparged under vacuum for about 15 to 20 minutes and then the product was removed from the reaction flask.

The resulting resin had a softening point of 142.5° C. (ring and ball, by ASTM E28-67 method), an acid number of about 13.4 (by ASTM D 465-59 method). The viscosity was X.3 (1:2 ARLO) and the ARLO solution had a MAGIESOL 47 (M47) tolerance of 115 milliliters. A 50% M47 solution of the resin had a viscosity of Z6.2 and a M47 tolerance of 14 milliliters.

EXAMPLE 2

In order to compare the properties of ink vehicles made with acid catalyzed rosin ester of Example 1 and a commercially available base catalyzed rosin ester, two ink vehicles were prepared. Each ink vehicle was made by dissolving 31.26 grams of phenolic modified rosin ester resin available from Arizona Chemical Company under the tradename BECKACITE-6024 (BC-6024) and 13.39 grams of a base catalyzed or acid catalyzed rosin ester in 20.35 grams of a high boiling hydrogenated aliphatic ink oil available from Exxon Chemical Company of Houston, Tex. under the tradename EXXPRINT 283D in a 500 mL three neck flask equipped with an agitator, temperature controller and nitrogen gas inlet. Nitrogen was used at a rate of 3.3 mL per minute to purge the flask. The flask was heated to 170° C. while stirring the mixture until all of the resin was dissolved. Next, 5 grams of ISOREZ #7 alkyd commercially available from the Degen Company of Jersey City, N.J., and 28 grams of EXXPRINT 283D were added to the solution. Next 2 grams of a 50 wt. % solution oxyaluminum octoate (OAO) in M47 was added slowly into the vortex created by stirring the mixture. The solution was heated for one hour at 170° C. The vehicles made by the process were then removed from the flask, placed in suitable storage containers and allowed to cool.

The viscosities of the ink vehicles made by the foregoing procedure were determined by use of a DUKE D-2050 viscometer from Duke Custom System, Inc. of Pleasant View, Tenn. at 25° C. and at a shear rate of 2500 sec.$^{-1}$. The solution tolerances was determined by titrating 10 grams of each solution with M47 to a cloud point (M47 tolerance).

The properties of the ink vehicles are contained in the following table.

TABLE 1

Lithographic Ink Vehicle Compositions and Properties

|  | Sample 1 | Sample 2 |
|---|---|---|
| Phenolic Modified Resin (BC-6024) (grams) | 31.26 | 31.26 |
| Co-resin (grams) | BC-4506[1] (13.39) | Resin of Example 1 (13.39) |
| EXXPRINT 283-D (grams) | 48.35 | 48.35 |
| Viscosity @ 25° C. (poise at 2500 sec$^{-1}$ shear rate) | 503 | 544 |
| Yield Value (dynes/cm$^2$ at 2.5 sec$^{-1}$ shear rate) | 6621 | 7698 |
| Shortness Ratio[2] | 13.1 | 14.2 |
| Slope[3] | 0.6757 | 0.6404 |
| M47 Tolerance (mL) | 20 | 20 |

[1] BC-4506 is BECKACITE 4506 which is a base catalyzed maleic modified rosin ester having a softening point of from about 125° to about 140° C. (ring and ball, by ASTM E28-67 method), an acid number of about 25 maximum (by ASTM D 465-59 method) which is commercially available from Arizona Chemical Company of Panama City, Florida.
[2] Shortness Ratio - is calculated as the yield value divided by viscosity and is defined in ASTM D 4040-89 as the property of a solution which prevents it from being drawn into a filament.
[3] Slope - a parameter measuring how far the resin solution deviates from a Newtonian solution.

As seen in the foregoing table, the properties of the ink vehicles are similar with the ink vehicle made with the acid catalyzed resin (Sample 2) having slightly higher viscosity, yield value and shortness ratio. Despite their similar rheological properties, the ink vehicle made with the acid catalyzed rosin ester had substantially lower water pick up (P/U) rates. The water P/U rates of each ink vehicle were determined using a Duke emulsification tester (Duke model D10). Each ink vehicle (50 grams each) was weighed into the mixing container of the tester with 50 grams of distilled water. The mixing container was then placed on the emulsification tester and run for 2 minute intervals until all water was emulsified with the vehicle. The percent water P/U was recorded for each vehicle over the testing period. The water P/U amounts for each ink vehicle are given in the following table.

TABLE 2

| Time (minutes) | Ink Vehicle containing base catalyzed rosin ester (Sample 1) (% water P/U) | Ink Vehicle containing acid catalyzed rosin ester (Sample 2) (% water P/U) |
|---|---|---|
| 2 | 28.82 | 27.96 |
| 6 | 36.06 | 29.10 |
| 10 | 39.70 | 32.44 |
| 14 | 45.62 | 35.10 |
| 16 | 48.24 | 39.20 |
| 20 | 53.06 | 40.60 |

As shown in the table, the ink vehicle containing the acid catalyzed rosin ester has substantially lower water P/U than the ink vehicle containing the base catalyzed rosin ester. This result was surprising and totally unexpected considering the similar rheological properties of the ink vehicles made with acid and base catalyzed rosin esters.

Hence, it is clear from the foregoing samples that an ink vehicle containing an acid catalyzed rosin ester will emulsify substantially less water during lithographic printing operations than the same ink vehicle made with a base catalyzed rosin ester.

The foregoing description of certain embodiments of the present invention has been provided for purposes of illustration only, and it is understood that numerous modifications and alterations may be made without departing from the spirit and scope of the invention as defined in the following claims.

What is claimed is:

1. A lithographic ink vehicle which comprises a primary resin component and a secondary resin component for improving the solubility of the primary resin component consisting essentially of an acid catalyzed rosin ester, an ink oil and, optionally, an organo-metallic gelling agent.

2. The ink vehicle of claim 1 wherein the acid catalyzed rosin ester comprises a maleic modified rosin ester of pentaerythritol.

3. The ink vehicle of claim 2 wherein the acid catalyzed rosin ester is selected from the group consisting of acid catalyzed gum, tall oil and wood rosin esters and acid catalyzed esters of dimerized rosin.

4. The ink vehicle of claim 1 wherein the acid catalyzed rosin ester is selected from the group consisting of acid catalyzed gum, tall oil and wood rosin esters and acid catalyzed esters of dimerized rosin.

5. The vehicle of claim 1 containing from about 20 to about 50% by weight of the primary resin component, from about 5 to about 25% by weight acid catalyzed rosin ester, from about 10 to about 55% by weight ink oil, from about 1 to about 30% by weight alkyd resin or vegetable oil or both and from about 0 to about 5 wt. % oxyaluminum octoate.

6. A lithographic ink formulation containing the ink vehicle of claim 5.

7. The vehicle of claim 1 wherein the acid catalyzed rosin ester comprises an acid catalyzed ester of a dimer rosin.

8. The vehicle of claim 1 wherein the primary resin component comprises a high viscosity phenolic modified rosin ester.

9. The vehicle of claim 1 wherein the primary resin component comprises a high viscosity maleic modified rosin ester.

10. The vehicle of claim 1 wherein the primary resin component comprises a high viscosity modified hydrocarbon resin.

11. A lithographic ink formulation containing the ink vehicle of claim 1.

12. A method for making an ink vehicle for lithographic inks which comprises reacting rosin or modified rosin with a polyol in the presence of a Bronsted acid catalyst to produce an acid catalyzed rosin ester, combining the acid catalyzed rosin ester with a primary resin component and an ink oil to provide an ink vehicle having a lower water take up rate than the same vehicle made with a base catalyzed rosin ester.

13. The method of claim 12 wherein the acid catalyzed rosin ester comprises an ester of dimer rosin and pentaerythritol.

14. The method of claim 12 wherein the acid catalyzed rosin ester comprises a maleic modified rosin ester of pentaerythritol.

15. The method of claim 12 wherein the acid catalyzed rosin ester is selected from the group consisting of acid catalyzed gum, tall oil and wood rosin esters and acid catalyzed esters of dimerized rosin.

16. The method of claim 12 further comprising a gelling agent and an alkyd resin wherein the ink vehicle contains from about 20 to about 50% by weight of the primary resin component, from about 5 to about 25% by weight acid catalyzed rosin ester, from about 10 to about 55% by weight ink oil, from about 1 to about 30% by weight alkyd resin or vegetable oil or both and from about 0 to about 5 wt. % oxyaluminum octoate.

17. The method of claim 12 wherein the primary resin component comprises a high viscosity phenolic modified rosin ester.

18. The method of claim 12 wherein the primary resin component comprises a high viscosity maleic modified rosin ester.

19. The method of claim 12 wherein the primary resin component comprises a high viscosity modified hydrocarbon resin.

* * * * *

UNITED STATES PATENT AND TRADEMARK OFFICE
CERTIFICATE OF CORRECTION

PATENT NO : 5,902,389
DATED : May 11, 1999
INVENTOR(S) : Thomas C. Jordan

It is certified that error appears in the above-identified patent and that said Letters Patent is hereby corrected as shown below:

Column 5, line 38, delete "95" and replace with --55--.

Signed and Sealed this

Eighth Day of February, 2000

Attest:

Q. TODD DICKINSON

Attesting Officer

Commissioner of Patents and Trademarks